(12) United States Patent  
Sutter et al.

(10) Patent No.: US 6,717,380 B1
(45) Date of Patent: Apr. 6, 2004

(54) METHOD FOR SHIFTING THE INSTANT OF COMMUTATION FOR A SENSORLESS AND BRUSHLESS DIRECT-CURRENT MOTOR AS WELL AS A SYSTEM FOR IMPLEMENTING THE METHOD

(75) Inventors: Joerg Sutter, Gaggenau (DE); Wolfgang Schwenk, Oberkirch-Tiegarten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/889,418

(22) PCT Filed: Oct. 11, 2000

(86) PCT No.: PCT/DE00/04008

§ 371 (c)(1),
(2), (4) Date: Nov. 20, 2001

(87) PCT Pub. No.: WO01/37419

PCT Pub. Date: May 25, 2001

(30) Foreign Application Priority Data

Nov. 17, 1999 (DE) .......................................... 199 55 248

(51) Int. Cl.[7] ................................................. H02P 3/08
(52) U.S. Cl. ....................... 318/254; 318/138; 318/439; 318/500; 318/459; 318/599; 388/800; 388/804; 388/811; 388/821; 388/928.1
(58) Field of Search ................................. 318/138, 254, 318/188, 439, 599, 459, 500; 377/800, 804, 806, 800 G, 811–815, 819–823, 928.1

(56) References Cited

U.S. PATENT DOCUMENTS

| 4,743,815 | A | * | 5/1988 | Gee et al. ................... 318/254 |
| 5,159,246 | A | * | 10/1992 | Ueki ........................... 318/254 |
| 5,200,675 | A | | 4/1993 | Woo ............................ 318/254 |
| 5,334,921 | A | | 8/1994 | Wehberg ..................... 318/721 |
| 5,339,013 | A | * | 8/1994 | Nakai et al. ................. 318/254 |
| 5,640,073 | A | * | 6/1997 | Ikeda et al. .................. 318/439 |
| 5,923,134 | A | * | 7/1999 | Takekawa .................... 318/254 |
| 5,982,133 | A | * | 11/1999 | Murakami et al. .......... 318/650 |
| 6,078,158 | A | * | 6/2000 | Heeren et al. ............... 318/430 |

FOREIGN PATENT DOCUMENTS

| DE | 39 40 568 | 12/1989 |
| DE | 39 40 569 | 6/1991 |
| DE | 41 42 274 | 6/1993 |

* cited by examiner

*Primary Examiner*—Rina I Duda
(74) *Attorney, Agent, or Firm*—Kenyon & Kenyon

(57) ABSTRACT

The present invention provides a method for shifting the instant of commutation for a sensorless and brushless direct-current motor (1), whose stator windings are fed by a multi-phase converter connection. The converter connection includes an output stage control (2), a commutation logic (3), a phase selector (4), and phase discriminator (5). A commutation detection (6) is supplied at one input (46) with the instantaneous value of the voltage induced in a phase, the instantaneous value being determined by the phase selector, and at a second input (47), with a reference voltage ($U_{ref}$) for comparison. The reference voltage ($U_{ref}$) can be changed by a commutation shift (7) in correspondence with a specific characteristic curve (71). A manipulated variable ($U_{st}$) is supplied by a manipulated-variable calculation (8) to the commutation shift (7) as a function of the setpoint speed ($N_{setpoint}$) of the motor. The commutation shift takes place in an advantageous manner in a parabola shape. As a result of the setpoint value-dependent commutation shift, a high torque is provided also in the case of high rotational speeds and a heavy load, and the torque ripple is kept to a minimum.

9 Claims, 2 Drawing Sheets

METHOD FOR SHIFTING THE INSTANT OF COMMUTATION FOR A SENSORLESS AND BRUSHLESS DIRECT-CURRENT MOTOR AS WELL AS A SYSTEM FOR IMPLEMENTING THE METHOD

BACKGROUND INFORMATION

The present invention starts out from a method for shifting the instant of commutation for a sensorless and brushless direct-current motor whose stator windings are fed by a multi-phase converter connection according to the definition of the species in claim 1 and also relates to a system for implementing this method according to claim 6.

DE 39 40 568.9 A1 describes a circuit configuration for operating a multi-phase synchronous motor at a direct-current supply. In this context, the phases are successively connected to the direct voltage and commutating circuits corresponding to the rotor position are controlled in such a manner that they overlap with respect to time for commutating subsequent phases, and at least one of the commutating circuits in the commutation range is clocked in such a manner that the average value of the current increases in the forward commutating phase and decreases in the reverse commutating phase. As a result of this overlapping and clocking of the switching signals in the commutation edges, there is less switching loss and a reduction in noise.

For sensorless and brushless direct-current motors, the instant of commutation is typically determined by measuring the induced voltage in a particular non-current carrying stator winding phase. In this context, this induced voltage is compared to a reference voltage that is derived from the actual value of the rotational speed. In this connection, significant power notches and ripples in the torque can occur, particularly in the case of large loads and high motor speeds. This is extremely disadvantageous.

The object of the present invention is to provide a method that enables the instant of commutation to be shifted for a sensorless and brushless direct-current motor so as to prevent or significantly reduce the power notch, and decrease the torque ripple.

SUMMARY OF THE INVENTION

With respect to the related art, the method according to the present invention for shifting the instant of commutation for a sensorless and brushless direct-current motor having the characteristic features of claim I has the advantage of an increase in power with a constant magnetic circuit and identical motor mechanics, and of a reduction in the torque ripple by adapting the commutation threshold to an optimum current waveform. Advantageously, there is also no power notch observed, as is in the case of a commutation shift dependent on the measured motor speed.

In the method according to the present invention, this is principally achieved in that commutation is detected by comparing the voltage induced in a non-energized stator winding phase to a reference voltage, and in that the reference voltage is changed in dependence upon the setpoint value of the motor speed and/or the manipulated variable calculated therefrom.

Advantageous further refinements and improvements of the method stated in claim 1 are rendered possible by the measures specified in the additional method claims.

According to a particularly advantageous and preferred specific embodiment of the method according to the present invention, the instant of commutation is shifted ahead with respect to time in such a manner that an optimum current waveform is achieved, i.e., optimum particularly with regard to an increase in power and/or a reduction in the torque ripple.

According to a particularly effective and advantageous embodiment and further refinement of the method according to the present invention, the instant of commutation is shifted in such a manner that the reference voltage is raised in the shape of a parabola.

In a further advantageous embodiment of this method feature, given a pulse width modulation of the current supplied to the stator windings, the reference voltage is raised in the shape of a parabola, beginning at a pulse width modulation ratio of about 90 to 95%, in particular 93%. Raising the commutation threshold in the shape of a parabola has the advantage that it results in a smoother transition to the pre-commutation state.

According to a further advantageous feature of an exemplary embodiment of the method according to the present invention, besides being used for changing the reference value for the instant of commutation, the manipulated variable determined in dependence upon the setpoint value of the rotational speed is also used for adapting the current supply to the individual stator winding phases, raising it or lowering it accordingly.

A preferred system for implementing the above-explained method with its different modifications includes a sensorless and brushless direct-current motor that is fed by a multi-stage converter connection, which, for its part, includes an output stage control, a commutation logic, a phase selector, and a phase discriminator, and is characterized in that a commutation detection is provided which is supplied at one input by the phase selector with the instantaneous value of the voltage induced in a non-energized phase and, at a second input, with a reference voltage, for comparison, and in that the reference voltage can be changed by a commutation shift in accordance with a specific curve, a manipulated variable being supplied to the commutation shift by a manipulated-variable calculation as a function of the setpoint speed of the motor.

In an advantageous embodiment of this system according to the present invention, it is provided that in the commutation shift, the reference voltage changes in accordance with a parabola, in particular, it is increased.

Given a pulse width modulation of the current supply to the individual stator winding phases of the motor, one advantageous embodiment of this system configuration provides that the reference voltage is increased in the shape of a parabola, starting from a pulse width modulation ratio of about 90 to 95%, preferably 93%. These percent values apply for a specific magnetic circuit design. Other designs of the magnetic circuit can result in significantly different values.

In a further advantageous and particularly effective configuration of the system according to the present invention, calculating the manipulated variable yields, as a non-linear function of the setpoint speed of the motor, a manipulated variable that, on the one hand, is supplied to the commutation shift as an input, and, one the other hand, is supplied to the commutation logic for adapting the current supply to the stator winding phases of the motor.

BRIEF DESCRIPTION OF THE DRAWING

The method according to the present invention and the system for implementing this method are more closely explained in the following description using an exemplary embodiment represented in the drawing. The figures show.

DESCRIPTION OF THE EXEMPLARY EMBODIMENT

Figure 1:
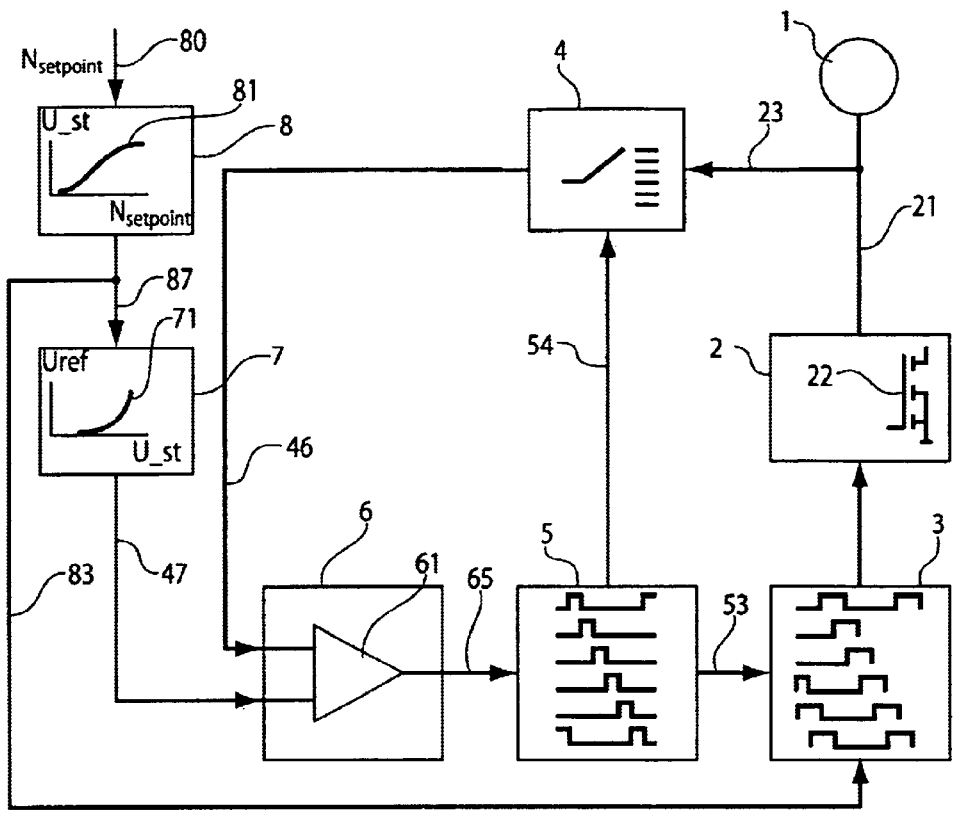
FIG. 1 shows a schematic block diagram for the commutation shift according to the present invention.

In a block diagram, FIG. 1 represents the commutation shift according to the present invention. A direct-current motor 1, which is sensorless and brushless, is fed by a multi-stage converter connection. For its part, this multi-stage converter connection, which can be three-phased and six-pulsed, for example, includes an output stage control 2, a commutation logic 3, a phase selector 4, a phase discriminator 5, as well as a commutation detection 6 as the main components. A MOSFET transistor 22 is symbolically represented in output stage control 2. The output stage control supplies motor 1 with energy via a multiple line 21. Branching off of these lines, the respective instantaneous value of the voltage induced in a non-current-carrying phase is supplied via one multiple line 23, one of the, for example, six phases being selected in each case for this purpose by phase selector 4. This instantaneous value of the respective phase is transmitted by phase selector 4 via line 46 to a first input of commutation detection 6. A reference voltage $U_{ref}$, which is formed from adding the battery voltage supplied to motor 1 to the voltage from the commutation shift, is fed via line 47 to a second input of the commutation detection.

For its part, commutation shift 7 is supplied by a manipulated-variable calculation 8 via a line 87 with a manipulated variable $U_{st}$. Setpoint value $N_{setpoint}$, of the rotational speed of motor 1 is available as an input value via line 80 for manipulated-variable calculation 8. Manipulated variable $U_{st}$ is determined in accordance with non-linear curve 81, which is represented in manipulated-variable calculation block 8, from this setpoint variable $N_{setpoint}$. This characteristic curve 81 is manipulated variable $U_{st}$, which is to be plotted over speed setpoint $N_{setpoint}$. Entered in block 7 of the commutation shift is a characteristic image in which manipulated variable $U_{st}$ obtained in block 8 is plotted on the horizontal axis, and reference voltage $U_{ref}$ is plotted on the vertical axis as a function thereof The plotted characteristic curve 71 is preferably parabolic. The output value of manipulated-variable calculation 8 is fed via a line 83 to commutation logic 3 to increase the currents for output stage control 2 and the power transistors 22 contained therein, in correspondence with the predefined rotational speed $N_{setpoint}$ in the commutation logic, the currents then being supplied with the correct timing via lines 21 to motor 1.

The clock-pulse generation for commutation logic 3 is carried out by phase discriminator 5, which, as an input on line 65, generates the result of the comparison of reference voltage $U_{ref}$ on line 47 and the instantaneous, phase-induced phase voltage on line 46 by comparator 61 in commutation detection 6. The output signal of phase discriminator 5, which is characterized by six different phases of pulse generation within block 5, is supplied via line 52 to commutation logic 3 and via line 54 to phase selector 4. As a result, phase selector 4 is adjusted to the correct phase for the commutation detection.

Figure 2:
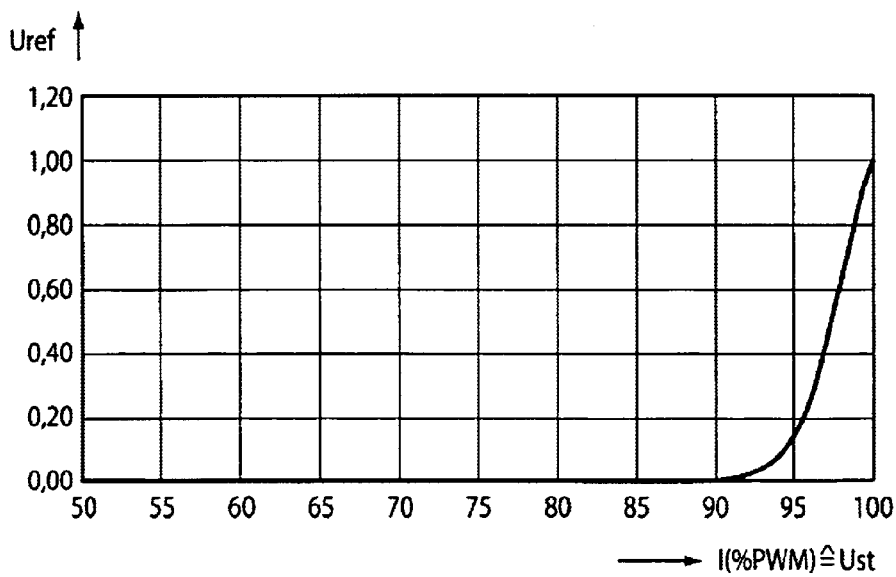
FIG. 2 shows a diagram having the reference voltage as a function of the manipulated variable and/or the current in parabolic dependency.

FIG. 2 provides another larger and more exact view of the characteristic curve represented in FIG. 1 within commutation shift 7, in a slightly different shape. In this context, the percent value of the pulse width modulation is plotted on the horizontal axis, this corresponding to manipulated variable $U_{st}$ for characteristic curve 71 within commutation shift 7 in FIG. 1. Plotted on the vertical axis is reference voltage $U_{ref}$, which is supplied to commutation detection 6 via line 47. The parabolic characteristic curve of reference voltage $U_{ref}$ begins to climb, namely in the shape of a parabola, starting at a pulse width modulation ratio of about 90%, especially 93%. This parabolic raising of the commutation threshold, i.e., of the reference voltage $U_{ref}$ supplied via line 47, has the advantage that the transition to the pre-commutation state is smooth. Pre-commutation state means that the instant of commutation is advanced from its usual temporal state to an early start.

Figure 3:
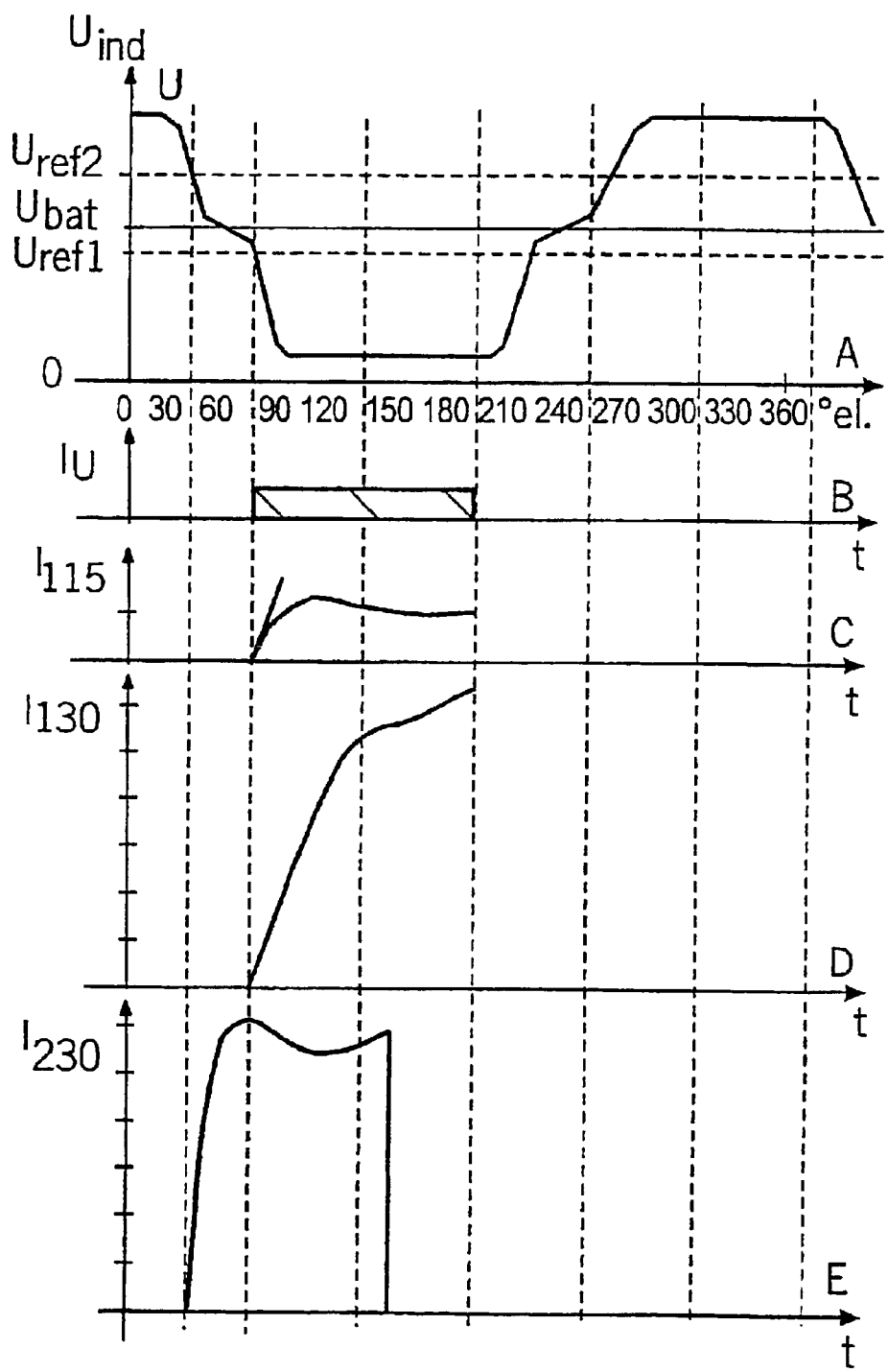
FIG. 3 shows different diagrams of the voltage curve of the induced voltage in one phase and of the current energization of this phase, and three different current waveforms for different reference voltages and different motor speeds, in general, current waveforms for different commutation thresholds.

FIG. 3 shows different diagrams and different current waveforms for different commutation thresholds. In the top diagram designated as A, voltage $U_{ind}$, which is induced in a phase U, for example, is plotted over the electrical angle. $U_{bat}$ designates the battery voltage of a motor vehicle or the normal voltage of a direct-current vehicle electrical distribution system of a motor vehicle. $U_{ref1}$, which is below the battery voltage, designates a first reference voltage, and $U_{ref2}$ a designates a second reference voltage that is significantly above the value of battery voltage $U_{bat}$. One can assume that voltage reference value $U_{ref1}$ approximately corresponds to the value 0.00 in FIG. 2, and voltage reference value $U_{ref2}$ in FIG. 3, diagram A approximately corresponds to the value 1.00 of reference value $U_{ref}$ in FIG. 2.

In diagram B of FIG. 3, IU designates the on-time of the current for phase U. If commutation is performed to reference value $U_{ref1}$, the current and current waveform are plotted over time t in diagram C of FIG. 3, the time corresponding, for this commutation threshold, to a setpoint speed of 1500 revolutions per minute, for example. Thus, current $I_{115}$ approximates the current waveform that, together with the voltage induced in the same phase, causes the torque.

Plotted over time t in diagram D of FIG. 3 is current waveform $I_{130}$, which ensues at a commutation threshold of voltage $U_{ref1}$ in diagram A of FIG. 3 and at a rotational speed of 3000 revolutions per minute. It is recognizable that the current can only slowly and weakly increase in this phase as a result of the winding inductance at hand.

Plotted over time t in diagram E of FIG. 3 are the current and current waveform $I_{230}$, which ensues at a commutation threshold of $U_{ref2}$ and at a rotational speed of 3000 revolutions per minute. It can be seen from the diagram that at the instant corresponding to voltage $U_{ref1}$ in diagram A, current $I_{230}$ is already built up to its full value, and, therefore, when the induced voltage increases, the full torque can be made immediately available for use.

In accordance with the present invention, the instant of commutation can change between those values that are between the points corresponding to commutation threshold $U_{ref1}$ and $U_{ref2}$ in diagram A. As a result of the temporal shift forward, commutation is correspondingly prematurely ended by the current being correspondingly switched off, as can be clearly seen from diagram E of FIG. 3.

The function of the method according to the present invention and of the system according to the present invention is explained using the example of a air-conditioner fan motor for use in a motor vehicle. This is represented in detail in FIG. 1–3 and was already extensively described above. In this context, it is important that in the case of such a blower, the load and, as such, the phase current increase quadratically with the rotational speed. Thus, for example, current $I_{115}$ in diagram C at 1500 revolutions/minute has a value of 3 amperes. Given a commutation to threshold value $U_{ref1}$, this current at 3000 revolution/minute has a value of 18 amperes according to diagram D in FIG. 3. It is recognizable from this representation that the shift of the commutation threshold is necessary to attain an optimum current waveform for all operating states, and, as such, a high torque in the case of a smaller torque ripple. Such an optimum current waveform is represented by current $I_{230}$ in diagram E of FIG. 3. As a result of such an optimum current waveform, the ohmic losses and the switching losses in the semiconductor circuit are kept as minimal as possible.

Due to the winding inductance, the phase current can only increase in a limited time. In the case of low rotational speeds, as is shown in diagram C of FIG. 3 by current $I_{115}$, this effect is not significantly noticeable with respect to the function angle. First in the case of average to high rotational speeds of about 1500 to 3000 revolutions/minute, does the restricted current increase have a negative effect on the torque formation, the torque being $M=c\Phi*I$, because at the instant the full, induced voltage is reached, $U_{ind} \approx c*\Phi$, the phase current is not yet built up. In diagram D of FIG. 3, this is particularly represented by and readily recognizable from current $I_{130}$. Shifting the commutation threshold having a reference voltage $U_{ref}$ that is greater than operating voltage $U_{bat}$, as shown in diagram A of FIG. 3, results in the phase current having already adjusted itself to its maximum value upon reaching the full, induced voltage $U_{ind}$. As a result, the maximum torque can also be attained. The continuous increase in the commutation threshold having value $U_{ref}$ starting from a defined setpoint speed enables the torque to be increased with constant motor mechanics.

Given drive systems having sensors attached, such an increase in torque is not possible due to the fixedly pre-defined position of the sensor. For sensorless drive systems that function using commutation shifting dependent on the actual value of the rotational speed, the disadvantage is that the commutation threshold is lowered in the case of a break of the speed due to a load increase. The resulting cancellation of the pre-commutation causes additional breaks in the rotational speed. This worsens the matter.

In contrast, the present invention in which the commutation shift is coupled to the speed setpoint ensures that this effect does not occur. The method according to the present invention and the system for its implementation according to the present invention advantageously provide a power increase with a constant magnetic circuit and identical motor mechanics, decrease the torque ripple, prevent power notches, and ensure a smooth transition to the pre-commutation state by increasing the commutation threshold in the shape of a parabola This is then particularly advantageous when the motor is used for application as a fan in motor vehicles, where the fan load increases quadratically with the rotational speed. In this case, the parabolic commutation shift is particularly advantageous for the smooth load transition.

What is claimed is:

1. A method for shifting an instant of commutation for a sensorless and brushless direct-current motor including stator windings fed by a multi-phase converter connection, comprising the steps of:
   detecting the instant of commutation by comparing a voltage induced in a stator winding phase in which no current is applied to a reference voltage;
   changing the reference voltage in dependence upon at least one of a setpoint value of a rotational speed of the direct-current motor and a manipulated variable calculated from the setpoint value; and
   shifting the instant of commutation such that the reference voltage is raised in a shape of a parabola.

2. The method according to claim 1, wherein:
   with respect to a pulse width modulation of a current supplied to the stator windings, the parabola-shaped raising of the reference voltage begins at a pulse width modulation ratio of about 90 to 95%.

3. The method according to claim 2, wherein:
   the pulse width modulation ratio is 93%.

4. The method according to claim 1, further comprising the step of:
   adapting a current supply to individual stator winding phases in accordance with the manipulated variable in order to one of raise and lower the current supply accordingly.

5. A system for shifting an instant of commutation, comprising:
   a multi-stage converter connection, including:
      an output stage control,
      a commutation logic,
      a phase selector, and
      a phase discriminator;
   a sensorless and brushless direct-current motor fed by the multi-stage converter connection;
   a commutation detection element, including:
      a first input supplied by the phase selector with an instantaneous value of a voltage induced in a non-energized phase, and
      a second input supplied with a reference voltage for comparison;
   a commutation shift element for changing the reference voltage in accordance with a specific curve, wherein in the commutation shift element, the reference voltage is changed in accordance with a parabola; and
   a manipulated-variable calculation element for supplying a manipulated variable to the commutation shift element as a function of a setpoint speed of the direct-current motor.

6. The system according to claim 5, wherein:
   the reference voltage is increased.

7. The system according to claim 5, wherein:
   with respect to a pulse width modulation of a current supply to individual stator winding phases of the direct-current motor, the reference voltage is increased in a parabola shape, starting from a pulse width modulation ratio of about 90 to 95%.

8. The system according to claim 7, wherein:
   the pulse width modulation ratio is 93%.

9. A system for shifting an instant of commutation, comprising:
   a multi-stage converter connection, including:
      an output stage control,
      a commutation logic,
      a phase selector, and
      a phase discriminator;
   a sensorless and brushless direct-current motor fed by the multi-stage converter connection;
   a commutation detection element, including:
      a first input supplied by the phase selector with an instantaneous value of a voltage induced in a non-energized phase, and a second input supplied with a reference voltage for comparison;

a commutation shift element for changing the reference voltage in accordance with a specific curve; and a manipulated-variable calculation element for supplying a manipulated variable to the commutation shift element as a function of a setpoint speed of the direct-current motor, wherein the manipulated-variable calculation element computes the manipulated variable as a non-linear function of the setpoint speed of the direct-current motor, and the manipulated variable is fed, on the one hand, as an input to the commutation shift element, and, on the other hand, to the commutation logic to adapt a current supply to stator winding phases of the direct-current motor.

* * * * *

UNITED STATES PATENT AND TRADEMARK OFFICE
CERTIFICATE OF CORRECTION

PATENT NO. : 6,717,380 B1
DATED : April 6, 2004
INVENTOR(S) : Joerg Sutter et al.

It is certified that error appears in the above-identified patent and that said Letters Patent is hereby corrected as shown below:

<u>Title page,</u>
Item [57], ABSTRACT,
Line 1, change "The present invention provides a method" to -- A method --
Lines 3-16, delete "(1), (2), (3), (4), (5), (6), (46), (47), ($U_{ref}$), ($U_{ref}$), (7), (71), ($U_{st}$), (8), (7), ($N_{setpoint}$)"

<u>Column 1,</u>
Line 8, change "BACKGROUND INFORMATION" to -- FIELD OF THE INVENTION --
Line 9, change "starts out from" to -- relates to --
Lines 12 to 14, change "converter connection according to the definition of the species in Claim 1 and also relates to a system for implementing this method according to Claim 6." to -- converter connection. --
Line 15, insert -- BACKGROUND INFORMATION --
Line 16, change "DE 39 40 568.9 Al" to -- German Published Patent Application No. 39 40 568.9 describes --
Lines 47 to 48, delete "having the characteristic feature of claim I"
Delete lines 63 to 65.

<u>Column 2,</u>
Line 65, change "DRAWING" to -- DRAWINGS --
Delete lines 66 to 67.

<u>Column 3,</u>
Delete lines 1 and 2.
Line 4, change "invention." to -- invention; --
Line 7, change "dependency, and;" to -- dependency. --
Delete Lines 15 and 16, and insert -- DETAILED DESCRIPTION --

UNITED STATES PATENT AND TRADEMARK OFFICE
CERTIFICATE OF CORRECTION

PATENT NO. : 6,717,380 B1
DATED : April 6, 2004
INVENTOR(S) : Joerg Sutter et al.

It is certified that error appears in the above-identified patent and that said Letters Patent is hereby corrected as shown below:

Column 5,
Line 12, change "is necessary to attain" to -- attains --

Signed and Sealed this

Nineteenth Day of April, 2005

JON W. DUDAS
*Director of the United States Patent and Trademark Office*